United States Patent
Goodzeit et al.

(10) Patent No.: US 8,371,534 B1
(45) Date of Patent: Feb. 12, 2013

(54) SYSTEM FOR ISOLATING VIBRATION AMONG A PLURALITY OF INSTRUMENTS

(75) Inventors: Neil E. Goodzeit, Princeton, NJ (US); Harald J. Weigl, Doylestown, PA (US); Michael Brett McMickell, Scottsdale, AZ (US); Timothy Andrew Hindle, Peoria, AZ (US)

(73) Assignees: Lockheed Martin Corporation, Bethesda, MD (US); Honeywell International, Inc., Morristown, NJ (US)

( * ) Notice: Subject to any disclaimer, the term of this patent is extended or adjusted under 35 U.S.C. 154(b) by 1225 days.

(21) Appl. No.: 12/187,299

(22) Filed: Aug. 6, 2008

Related U.S. Application Data (60) Provisional application No. 60/972,731, filed on Sep. 14, 2007.

(51) Int. Cl.
*B64G 1/66* (2006.01)
*F16F 7/10* (2006.01)
*F16F 7/104* (2006.01)

(52) U.S. Cl. ............ 244/173.2; 188/378; 188/379; 188/380; 267/136; 248/560; 248/562

(58) Field of Classification Search ............ 244/173.2, 244/173.1; 188/378–380; 267/136; 248/560, 248/562, 618
See application file for complete search history.

(56) References Cited

U.S. PATENT DOCUMENTS

| | | | | |
|---|---|---|---|---|
| 3,668,939 A * | 6/1972 | Schrader | | 74/61 |
| 3,703,999 A * | 11/1972 | Forys et al. | | 248/550 |
| 4,679,753 A * | 7/1987 | Landecker | | 244/171 |
| 4,848,525 A * | 7/1989 | Jacot et al. | | 188/378 |
| 5,131,611 A * | 7/1992 | Vollaro | | 244/173.1 |
| 5,133,517 A * | 7/1992 | Ware | | 244/171.1 |
| 5,348,124 A * | 9/1994 | Harper | | 188/378 |
| 5,366,198 A * | 11/1994 | Dickinson | | 248/550 |
| 5,654,549 A * | 8/1997 | Landecker et al. | | 250/332 |
| 6,029,959 A * | 2/2000 | Gran et al. | | 267/136 |
| 6,062,526 A * | 5/2000 | Morgenthaler | | 248/550 |
| 6,173,155 B1 * | 1/2001 | Norin | | 455/12.1 |
| 6,454,215 B1 * | 9/2002 | Pedreiro | | 244/173.1 |
| 6,648,295 B2 * | 11/2003 | Herren et al. | | 248/636 |
| 6,871,565 B2 * | 3/2005 | Allaei | | 248/559 |
| 7,104,506 B1 | 9/2006 | Goodzeit et al. | | |
| 7,104,515 B2 * | 9/2006 | Harless et al. | | 248/562 |
| 7,248,228 B2 * | 7/2007 | Harless et al. | | 343/878 |
| 7,631,839 B1 * | 12/2009 | Duncan et al. | | 244/158.1 |
| 7,950,633 B2 * | 5/2011 | Hiley et al. | | 267/136 |
| 8,052,093 B2 * | 11/2011 | Faucheux et al. | | 244/165 |
| 2006/0102825 A1 * | 5/2006 | Harless et al. | | 248/562 |
| 2006/0260221 A1 * | 11/2006 | Kemeny | | 52/167.5 |
| 2007/0139292 A1 * | 6/2007 | Harless et al. | | 343/878 |
| 2008/0272240 A1 | 11/2008 | Goodzeit et al. | | |
| 2009/0120217 A1 * | 5/2009 | Hindle et al. | | 74/5.4 |
| 2010/0020742 A1 * | 1/2010 | Goodzeit et al. | | 370/316 |
| 2010/0032876 A1 * | 2/2010 | Hiley et al. | | 267/140.5 |

FOREIGN PATENT DOCUMENTS

JP  2007010088  * 1/2007

* cited by examiner

*Primary Examiner* — Joseph W Sanderson
(74) *Attorney, Agent, or Firm* — McDermott Will & Emery LLP (57) ABSTRACT

A system for isolating vibration among a plurality of instruments on a spacecraft includes at least two platforms, each of which is configured to couple to and isolate vibration for a single one of the plurality of instruments. Each of the at least two platforms is configured to mount to the spacecraft. A device is also provided for isolating vibration for one instrument among a plurality of instruments on a spacecraft.

18 Claims, 8 Drawing Sheets

SYSTEM FOR ISOLATING VIBRATION AMONG A PLURALITY OF INSTRUMENTS

CLAIM OF PRIORITY UNDER 35 U.S.C. §119

This application claims the benefit of priority under 35 U.S.C. §119 from U.S. Provisional Application Ser. No. 60/972,731, entitled "SPLIT-DECK SPACECRAFT CONFIGURATION FOR INSTRUMENT VIBRATION ISOLATION," filed Sep. 14, 2007, which is hereby incorporated by reference in its entirety for all purposes.

STATEMENT AS TO RIGHTS TO INVENTIONS MADE UNDER FEDERALLY SPONSORED RESEARCH OR DEVELOPMENT

The U.S. Government has a paid-up license in this invention and the right in limited circumstances to require the patent owner to license others on reasonable terms as provided for by the terms of Contract No. DG133E-05-CN-1166 awarded by the National Oceanic and Atmospheric Administration ("NOAA").

FIELD

The subject technology relates generally to vibration isolation systems, and more specifically to a system and device for isolating vibration among a plurality of instruments.

BACKGROUND

Spacecraft systems (e.g., remote sensing spacecraft systems) may include precision instruments which typically require a low jitter in-orbit environment to operate correctly. In addition, these instruments may be in proximity with attitude sensors, including star trackers and an inertial measurement unit (IMU). In this regard, two large earth-oriented instruments may need to be accommodated. For example, a spacecraft may include instruments such as an imager and a sounder. Each instrument produces disturbances, which can affect another instrument's operation. Accordingly, a system for reducing the amount of vibration among precision instruments on a spacecraft is desired.

SUMMARY

In accordance with the disclosure, at least two separate vibration isolated instrument platforms are configured to mount to a spacecraft nadir facing deck and to provide vibration isolation. The platforms are seen to improve the above-described problems related to instrument interaction.

In one aspect of the disclosure, a system for isolating vibration among a plurality of instruments on a spacecraft is provided. The system includes at least two platforms, each of which is configured to couple to and isolate vibration for a single one of the plurality of instruments. Each of the at least two platforms is configured to mount to the spacecraft.

In yet a further aspect of the disclosure, a device for isolating vibration for one instrument among a plurality of instruments on a spacecraft is provided. The device includes a platform configured to couple to and isolate vibration for the one instrument. The platform is configured to mount to the spacecraft.

It is to be understood that both the foregoing summary of the invention and the following detailed description are exemplary and explanatory and are intended to provide further explanation of the invention as Claimed.

DETAILED DESCRIPTION

Figure 1:
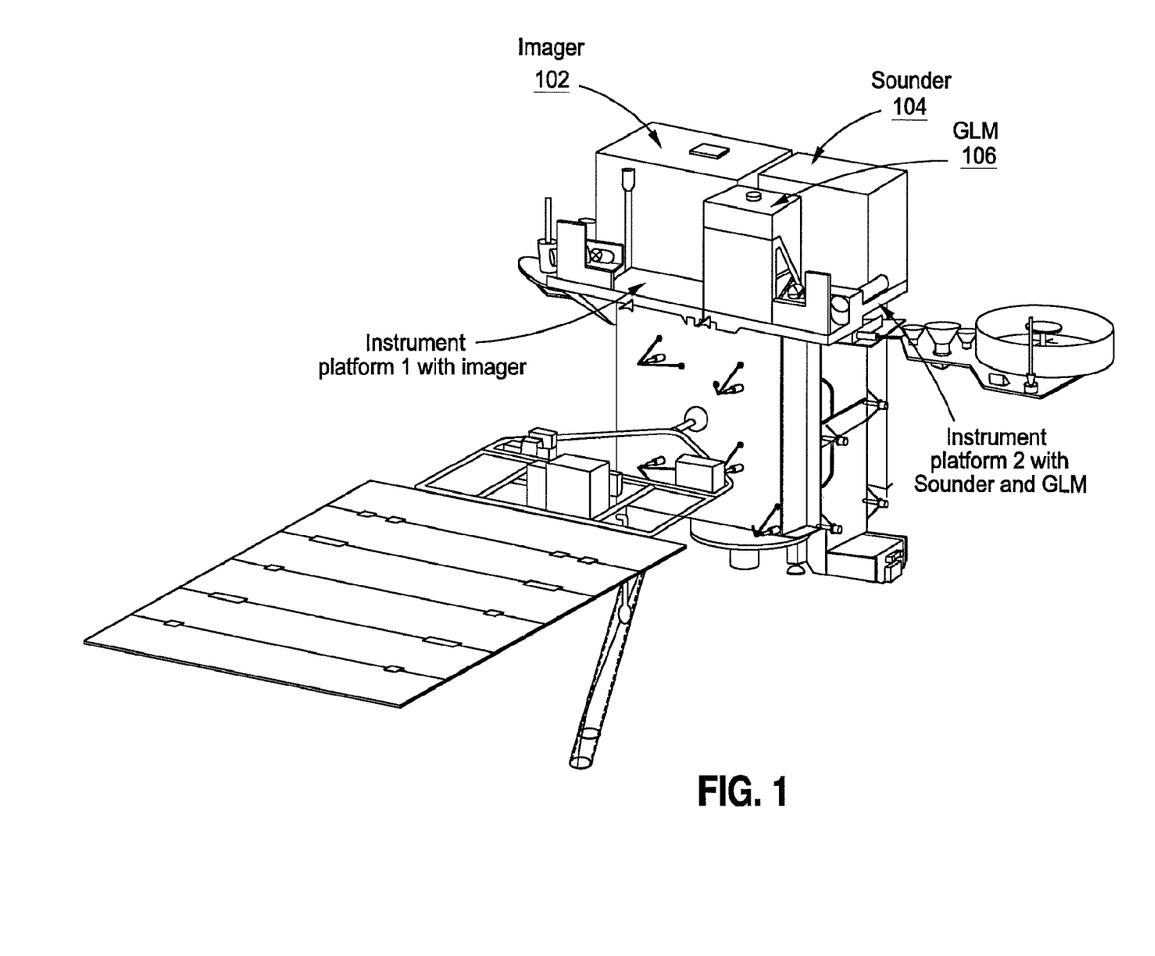
FIG. 1 is a perspective view diagram of a spacecraft system for isolating vibration for instruments on a spacecraft.

FIG. 1 is a perspective view diagram of a spacecraft system for isolating vibration for instruments on a spacecraft. As can be seen in FIG. 1, an independent platform (e.g., platform 1 or 2) may accommodate each of the primary instruments (e.g., imager 102, sounder 104).

As noted above, each instrument on a spacecraft may produce disturbance, which can affect another instrument's operation. In addition, mirror scanning disturbances, which tend to be at low frequency (<10 Hz), can be compensated by sensing interface motion with the inertial measurement unit (IMU) and providing this information to each instrument's corrective steering mirror. Unfortunately, higher frequency disturbance effects (>10 Hz), such as those produced by each instrument's cryo-coolers, are typically not easy to correct. This is because at higher frequencies, the interface motion sensed by the IMU is typically not an accurate indicator of actual instrument internal vibration, due to higher frequency dynamics. Although an instrument can be designed to mitigate the effect of its own cooler disturbances (e.g., the cooler may be mechanically isolated from the optics), disturbances from another instrument's cooler may be problematic. For example, it is possible that imager disturbances may produce jitter that impacts sounder measurement quality, particularly because of the long integration times (e.g., tenth of a second or longer) needed for advanced long wave length sounders.

A spacecraft design may incorporate both the imager and sounder on a single instrument platform that is attached to the spacecraft earth-facing panel. The instrument interaction problem described above may be addressed by specifying allowable disturbance bounds for each instrument, and by designing each instrument to mitigate the other's disturbance effects. However, this may be technically difficult and expensive to implement.

For example, the effect of each instrument typically depends on its disturbances and both the instrument and spacecraft dynamics. These factors are generally not known with much certainty, particularly when both spacecraft and instrument designs are developed concurrently. In addition, instruments designed to mitigate the disturbance effects of a companion are generally more complex and expensive. This complexity typically translates to increased mass and volume, which may increase launch cost and reduce growth capability. Furthermore, such an arrangement is generally not adaptable. For example, upgrading one instrument may force a re-design of its companion. Also, if an existing off-the-shelf instrument is to be used, a re-design of one or both instruments may be necessary, with significant impact to program cost and schedule.

As can be seen in FIG. 1, instead of employing a single platform for multiple primary instruments, the spacecraft system of FIG. 1 may incorporate two separate vibration isolated instrument platforms on a spacecraft nadir (or earth) facing deck. Such a configuration may isolate vibration associated with instrument interaction. Each platform may accommodate a single primary instrument. The platforms will be described in greater detail below.

The spacecraft system depicted in FIG. 1 may correspond to a geosynchronous earth orbit (GEO) remote sensing spacecraft configuration. For example, on a geostationary operational environmental satellite (GOES), platform 1 may accommodate an imager 102 (e.g., advanced baseline imager (ABI)). Further, platform 2 may accommodate a sounder 104 and/or a geostationary lightning mapper (GLM) 106. As described later, each platform may have its own attitude sensing including star trackers and an IMU. In addition, each platform may have its own kinematic mounting interface with tunable struts that form the attachment to the spacecraft nadir deck. The strut geometry may be optimized and parameters tuned to provide damped isolation modes within a predefined frequency band.

Figure 2:
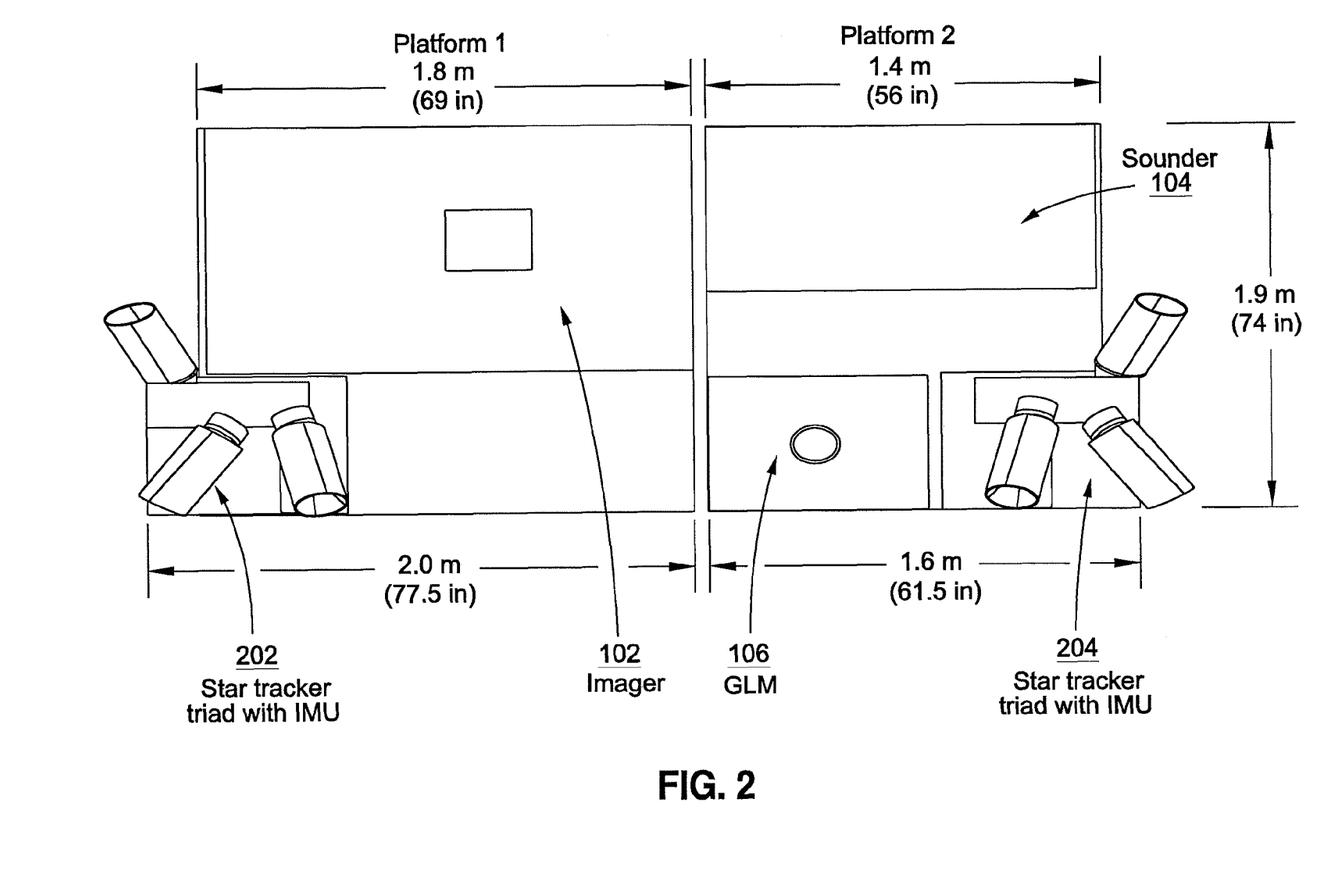
FIG. 2 is a conceptual diagram illustrating an exemplary platform layout for vibration isolation.

FIG. 2 is a conceptual diagram illustrating an exemplary platform layout for vibration isolation. As noted above, instrument platform 1 may accommodate an imager 102 (e.g., an ABI), and instrument platform 2 may accommodate a sounder 104 and/or a GLM 106. Each of platforms 1 and 2 may include a star tracker triad with an IMU assembly (e.g., elements 202 and 204, respectively) for high accuracy attitude and rate sensing. Both imager 102 and sounder 104 may have internal cryo-coolers (not shown) for cooling their optics and focal planes. These cryo-coolers may generate disturbances, for example at 62.5, 125 Hz, and higher harmonics, or at other frequencies. The frequencies may be high enough so that their effects on line-of-sight pointing may not be accurately measured by the IMU and compensated by mirror steering or other means.

If located on a single platform, imager 102 and sounder 104 could interact, thereby degrading the quality of instrument measurements. For example, base motion due to imager 102 disturbance could affect the sounder 104 and vice versa.

It should be noted that is it not necessary for GLM 106 to be isolated from either imager 102 or sounder 104. This is because GLM 106 typically has a short integration time (i.e., 0.002 sec), and less sensitivity to jitter.

Figure 3:
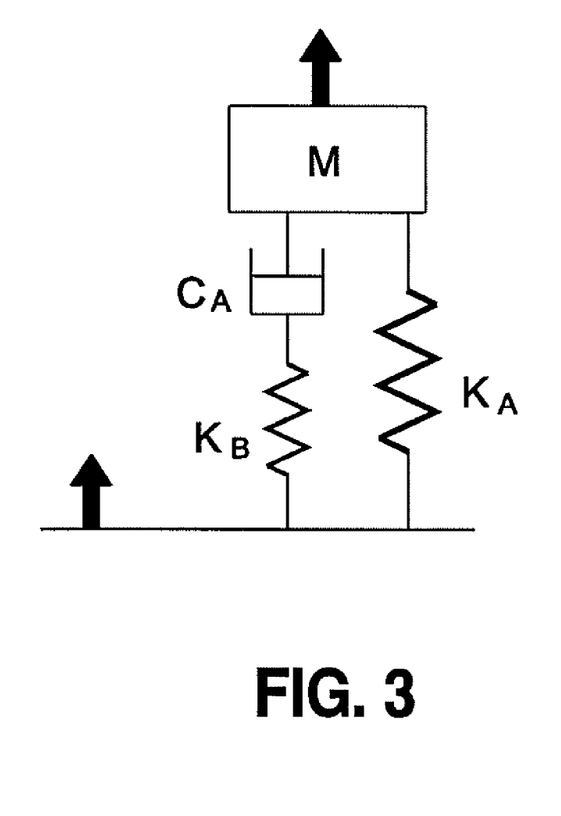
FIG. 3 is a conceptual diagram illustrating an exemplary isolator strut model for a platform for vibration isolation.

FIG. 3 is a conceptual diagram illustrating an exemplary isolator strut model for a platform (e.g., platform 1 or 2 of FIGS. 1 and 2) for vibration isolation. As noted above, each platform may be attached to the underlying spacecraft nadir (or earth) deck with isolator struts (e.g., six isolator struts). FIG. 3 shows a simplified strut mechanical model which includes two springs and a damper (e.g., a 3 parameter model), and an attached payload mass M. Such struts may be designed to provide specified stiffness and damping properties. For simplicity of implementation, all the struts for platform 1 of FIGS. 1 and 2 may have the same stiffness and damping, and all the struts for platform 2 of FIGS. 1 and 2 may have the same stiffness and damping. However, it is not necessary for all of the struts within platform 1 or 2 to be the same. Also, the stiffness and damping values of the platform 1 struts will typically differ from those of the platform 2 struts.

Figure 4A:
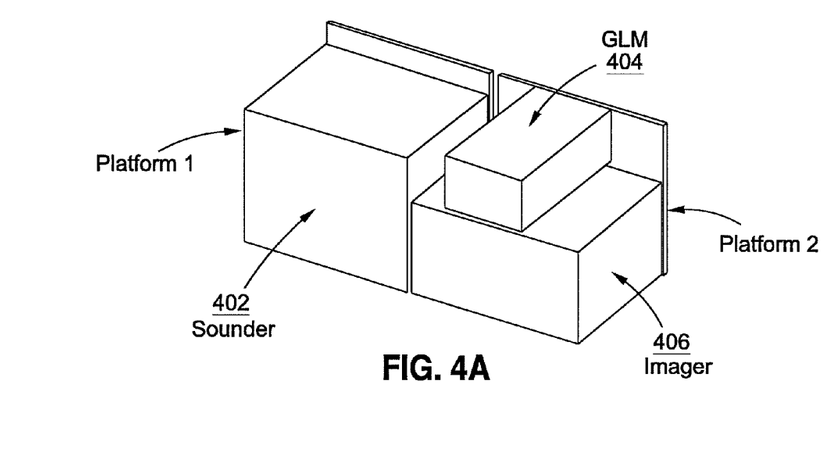
FIGS. 4A and 4B are conceptual diagrams illustrating a further exemplary platform layout for vibration isolation.
Figure 4B:
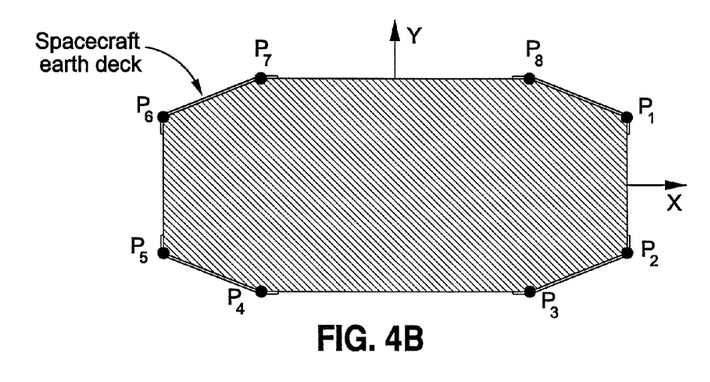

FIGS. 4A and 4B are conceptual diagrams illustrating a further exemplary platform layout for vibration isolation. As can be seen in FIG. 4A, the platform layout is a split-deck instrument platform configuration. Platform 1 may accommodate a sounder 402 (e.g., a hyperspectral environmental suite (HES)), and platform 2 may accommodate an imager 406 (e.g., an ABI) and a GLM 404.

To obtain improved isolation performance between each platform in the spacecraft bus and between the platforms, two optimization steps may be performed. The first step may be used to determine the strut locations which minimize a cost function, the cost function being the ratio of the maximum to the minimum frequency of the 12 undamped isolation system modes associated with the two instrument platforms, as follows:

$$J = \max(f_i)/\min(f_i) \; i=1 \text{ to } 12 \quad \text{(Equation 1)}$$

The optimization may be used to solve for the six mounting locations on both platforms, the twelve mounting locations on the underlying spacecraft earth deck, and the ratio of the strut stiffness for the two platforms. For this first step, the struts may be modeled as simple axial springs, with an arbitrary assigned stiffness for platform 1 and an initial platform-to-platform strut stiffness ratio of 1. The strut parameters ($K_A$, $K_B$ and $C_A$) for each platform may then be solved for in the second optimization step as described below.

FIG. 4B illustrates an allowable earth deck region for strut mounting, which may be defined by perimeter points $P_1$ to $P_8$. For example, the coordinates of P may be as follows:

$$P = \begin{bmatrix} X & Y & Z \\ 70.000 & 22.7700 & 129.047 \\ 70.000 & -22.7700 & 129.047 \\ 39.7500 & -37.2000 & 129.047 \\ -39.7500 & -37.2000 & 129.047 \\ -70.0000 & -22.7700 & 129.047 \\ -70.0000 & 22.7700 & 129.047 \\ -39.7500 & 37.2000 & 129.047 \\ 39.7500 & 37.2000 & 129.047 \end{bmatrix} \quad \text{(Equation 2)}$$

In FIG. 4B, the X and Y axes are as shown, emanating from the geometric center of the earth deck. The Z-axis may be along the spacecraft center line and give the distance above the spacecraft separation plane, which may define the attachment to the launch vehicle. The optimization may allow the strut end points to vary within the prescribed earth deck region and within the footprint of each instrument platform. The procedure may use a rigid body model for the bus and the instrument platforms (with instruments).

Once the strut attachment points are determined in the first step, a next step of determining the strut parameters ($K_A$, $K_B$ and $C_A$) for each platform that provide the specified minimum isolation mode frequency $f_{min}$ and the target modal damping may be performed. This second optimization may be performed by solving for the strut parameters for each platform that minimize a cost function of the form, as follows:

$$J = C_1(\min(f_i) - f_{min})^2 + C_2(\rho_{max} - \rho_{target})^2 + C_3(\rho_{min} - \rho_{target})^2 \quad \text{(Equation 3)}$$

In this expression, $\rho_{target}$ is the target modal damping, and $\rho_{max}$ and $\rho_{min}$ are the modal damping ratios of the isolation system maximum and minimum frequency modes. The coefficients may determine the relative weighting of terms in the cost function. For the analysis described below $C_1=0.5$, $C_2=C_3=0.25$.

Generally, it may be desired to place the minimum isolation frequency above the instrument scanning frequencies, so that the disturbances react against the total inertia of the instruments, instrument platform, and spacecraft core, to reduce the motion induced by these disturbances. At higher frequencies the isolation system must typically attenuate the effects of spacecraft disturbances on the instruments, for example, disturbances due to reaction wheel assemblies (RWAs) and thruster firing. Also, at higher frequencies, isolation between the primary instruments may be desired. In view of this, for the remote sensing spacecraft described above, a minimum isolation mode frequency $f_{min}$ of 4 Hz may be selected. Therefore, the instruments may be dynamically coupled to the spacecraft bus below this frequency, and become progressively decoupled from the spacecraft and each other as the frequency increases above 4 Hz.

The optimization approach described above was applied to a spacecraft similar to that depicted in FIG. 1, with the instrument platform and spacecraft earth deck configuration similar to that depicted in FIGS. 4A and 4B. The resulting spacecraft bus mass, center-of-mass location, and inertia matrix were as follows: Spacecraft bus mass=8.536 lbs-sec²/in; Spacecraft center-of-mass (CM) location (X,Y,Z)=−0.433 4.797 62.79 inches; with an inertia matrix of:

$$J = \begin{bmatrix} 61674 & -89.5 & -71.3 \\ -89.5 & 20900 & 23030 \\ -71.3 & 2303 & 55760 \end{bmatrix} \text{Inertia [lbs-in-sec}^2\text{]} \quad \text{(Equation 4)}$$

Further, the resulting mass properties of each instrument platform with its respective instrument complement were as follows: Platform 1 mass (HES, optical bench)=1.6278 lbs-sec²/in; Platform 1 CM (HES, optical bench)=−36.07 −3.036 156.0 inches; with an inertia matrix of:

$$J = \begin{bmatrix} 1093 & -4.2 & 3.5 \\ -4.2 & 1079.8 & -8.8 \\ -3.5 & -8.8 & 1241.1 \end{bmatrix} \text{Platform 1 Inertia [lbs-in-sec}^2\text{]} \quad \text{(Equation 5)}$$

Platform 2 results were as follows: Platform 2 mass (ABI, GLM, optical bench)=1.8085 lbs-sec²/in; Platform 2 CM (ABI, GLM, optical bench)=31.46 −8.34 157.3 inches; with an inertia matrix of:

$$J_{payload} = \begin{bmatrix} 1175.3 & -25.5 & -137.9 \\ -25.5 & 1463 & -74.6 \\ -74.6 & -74.6 & 1483 \end{bmatrix} \text{Platform 2 Inertia [lbs-in-sec}^2\text{]} \quad \text{(Equation 6)}$$

Tables 1A to 1D give the optimized strut locations for each instrument platform. As described above, the strut geometry may be selected to minimize the isolation system mode frequency spread ratio. In this example, a hybrid optimization process was used. First, a particle swam optimizer was used to provide a complete search of the design space. Then, a gradient-based search was used to refine the results of the initial optimization.

The results for the optimized geometry for the ABI with the GLM payload were as follows:

TABLE 1A

| Strut payload positions (x, y, z) | | |
|---|---|---|
| 61.3 | 13.7 | 135.5 |
| 57.8 | −24.8 | 135.5 |
| −0.7 | 6.2 | 135.5 |
| 41.7 | 30.1 | 135.5 |
| 38.1 | −32.7 | 135.5 |
| −0.6 | −19.0 | 135.5 |

TABLE 1B

| Strut bus positions (x, y, z) | | |
|---|---|---|
| 57.3 | 27.6 | 129.0 |
| 55.4 | −29.7 | 129.0 |
| −7.2 | 3.8 | 129.0 |
| 45.1 | 34.6 | 129.0 |
| 43.9 | −35.2 | 129.0 |
| −6.1 | −16.4 | 129.0 |

Further, the results for the optimized geometry for the HES payload were as follows:

TABLE 1C

| Strut payload positions (x, y, z) | | |
|---|---|---|
| −31.1 | −34.7 | 135.5 |
| −65.0 | −17.7 | 135.5 |
| −3.5 | 23.9 | 135.5 |
| −4.2 | −31.2 | 135.5 |
| −64.6 | 13.8 | 135.5 |
| −27.8 | 34.5 | 135.5 |

TABLE 1D

| Strut bus positions (x, y, z) | | |
|---|---|---|
| −23.7 | −36.9 | 129.0 |
| −70.0 | −12.3 | 129.0 |
| −2.4 | 30.7 | 129.0 |
| −3.1 | −37.2 | 129.0 |
| −70.0 | 8.9 | 129.0 |
| −21.7 | 36.7 | 129.0 |

Figure 5:
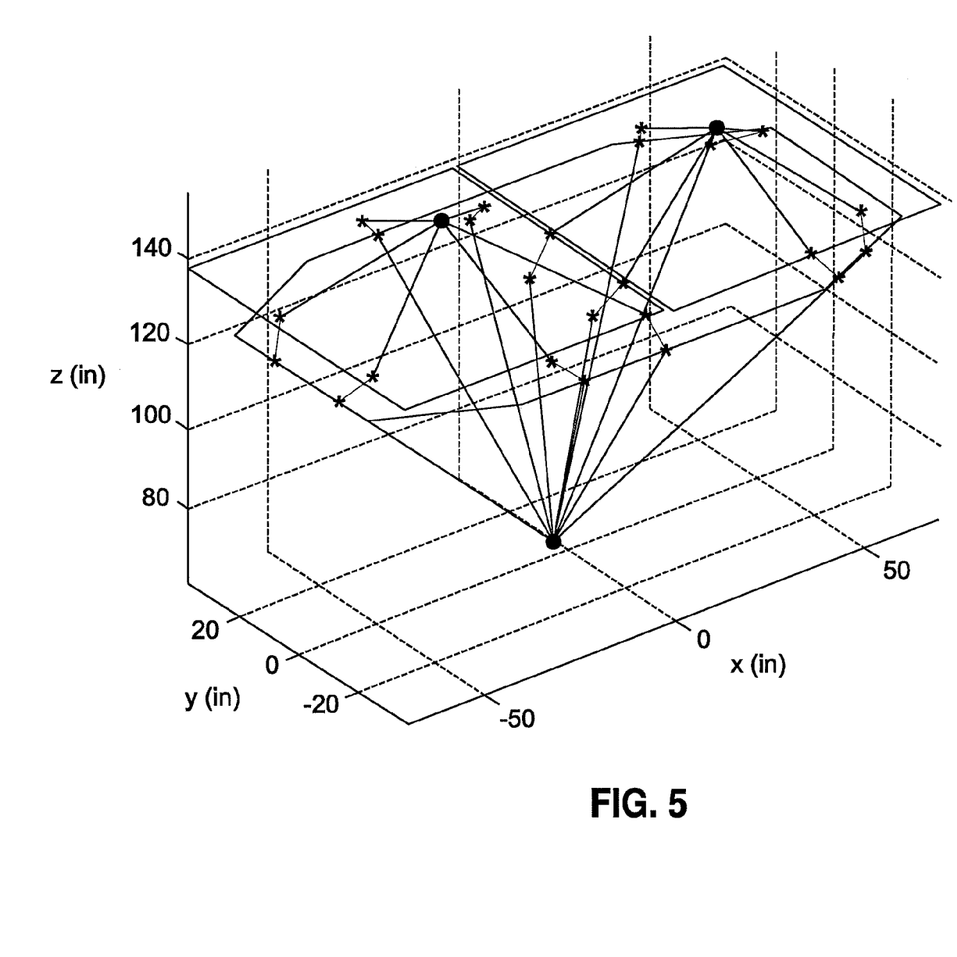
FIG. 5 is a conceptual diagram illustrating an exemplary strut configuration for vibration isolation.

FIG. 5 is a conceptual diagram illustrating an exemplary strut configuration for vibration isolation. FIG. 5 illustrates an isometric view of the split-deck optimized strut geometry. The instrument platforms and spacecraft earth deck are outlined in blue, and the individual struts are shown in black. Lines from the strut instrument platform attachment points to the instrument center-of-mass locations are shown in red, and lines from the strut earth deck attachment points to the spacecraft center of mass are shown in magenta.

A hybrid optimization approach was also used to solve for the optimal strut parameters for each instrument platform, to provide a minimum frequency of 4 Hz and a target mode damping of 0.5. Table 2 provides the optimized strut parameters, and Table 3 provides the isolation system frequencies and damping ratios, based on a rigid body dynamics model.

TABLE 2

Optimized Isolation System Strut Parameters

| Strut Parameter | Platform 1 | Platform 2 |
|---|---|---|
| $K_A$ (lb/in) | 676 | 900 |
| $K_B$ (lb/in) | 2322 | 3000 |
| $C_A$ (lb/in/sec) | 29 | 26 |

TABLE 3

Isolation System Modes (Rigid Body Dynamics Model)

| Frequency (Hz) | Damping Ratio |
|---|---|
| 4.0 | 0.51 |
| 4.2 | 0.48 |
| 4.3 | 0.46 |
| 5.2 | 0.46 |
| 6.5 | 0.53 |
| 6.9 | 0.52 |
| 7.1 | 0.51 |
| 9.3 | 0.48 |
| 10.9 | 0.43 |
| 11.1 | 0.40 |
| 11.6 | 0.42 |
| 11.7 | 0.47 |

As can be seen from the resulting values, the minimum frequency was 4 Hz, and the maximum mode frequency was 11.7 Hz, which corresponds to a mode frequency spread ratio of 2.9. Also, the minimum damping ratio was 0.4. It should be noted that increased damping is possible by specifying a higher target, but this will typically result in a larger frequency spread.

Table 4 shows the resulting isolation system mode frequencies and damping, for the optimized isolation system with flexible body models of the spacecraft and instrument platforms.

TABLE 4

Isolation System Modes (Flexible Body Dynamics Model)

| Frequency (Hz) | Damping Ratio |
|---|---|
| 4.293 | 0.413 |
| 4.425 | 0.408 |
| 4.975 | 0.474 |
| 5.429 | 0.418 |
| 6.745 | 0.466 |
| 6.840 | 0.458 |
| 8.897 | 0.398 |
| 9.352 | 0.397 |
| 10.474 | 0.396 |
| 11.926 | 0.337 |
| 12.428 | 0.277 |
| 13.000 | 0.312 |

The results show that the mode spread increases slightly to 3 and the minimum mode damping reduces to about 0.3. The reduction in damping can be expected, due to structural flexibility. Increased damping can be recovered by further tuning of the isolator parameters, at the expense of an increased mode frequency spread.

Figure 6:
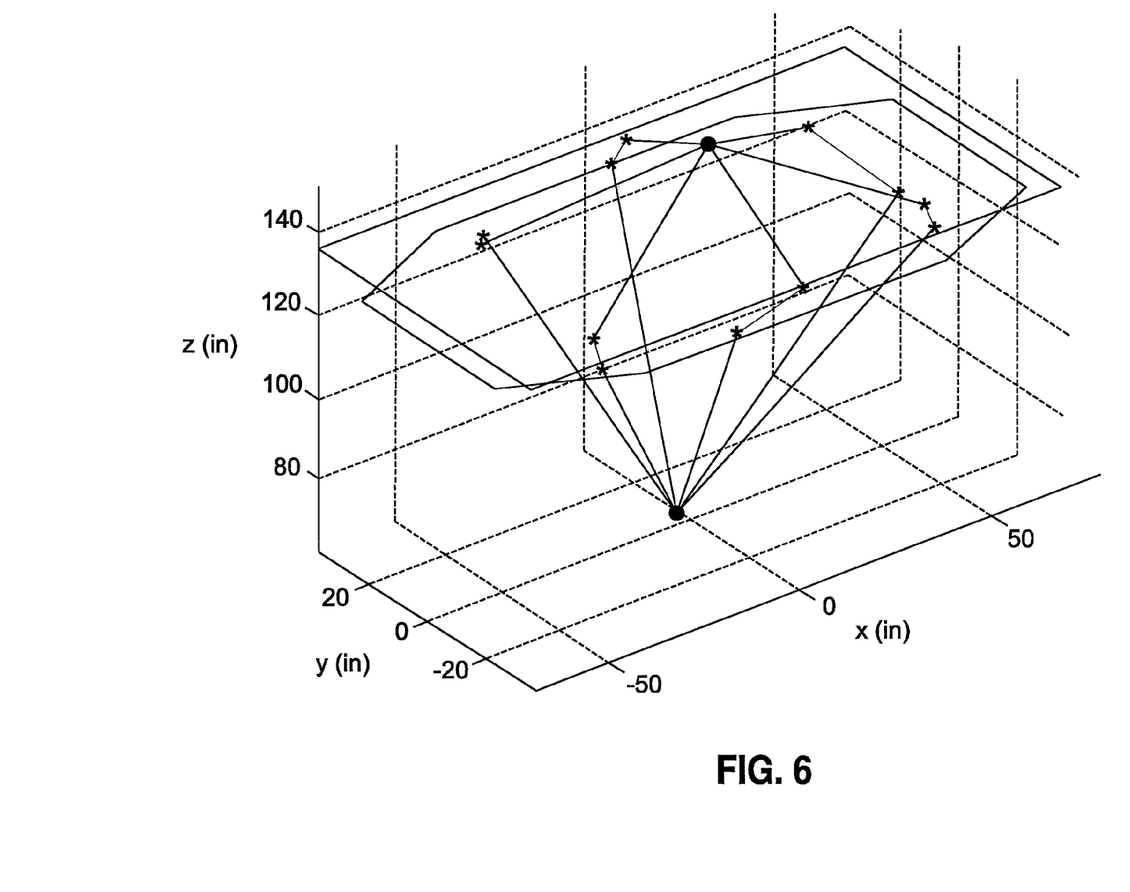
FIG. 6 is a conceptual diagram illustrating an exemplary strut configuration corresponding to a single platform.

FIG. 6 is a conceptual diagram illustrating an exemplary strut configuration corresponding to a single platform. FIG. 6 is an isometric view of a single platform optimized strut configuration. The single platform accommodates all of the instruments, including the ABI, HES, and GLM. In addition, this single platform system was optimized to minimize the mode frequency spread, to constrain the minimum frequency to 4 Hz, and to target a mode damping ratio of 0.5.

Figure 7:
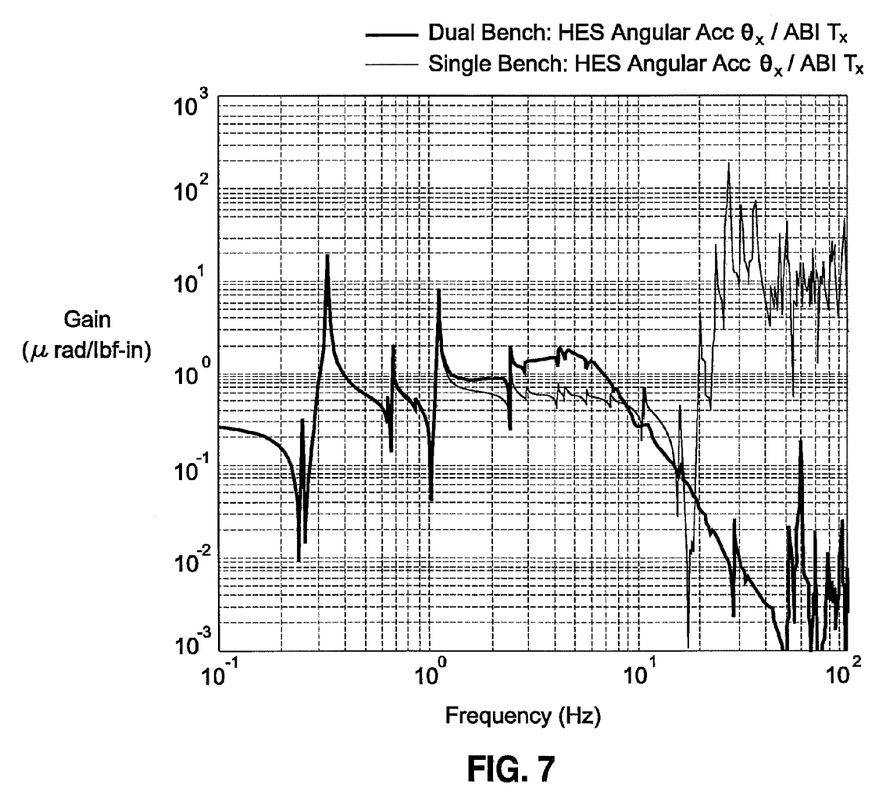
FIG. 7 is a graph illustrating an exemplary frequency response function (FRF) from advanced baseline imager (ABI) X-axis disturbance torque to hyperspectral environmental suite (HES) X-axis angular acceleration.
Figure 8:
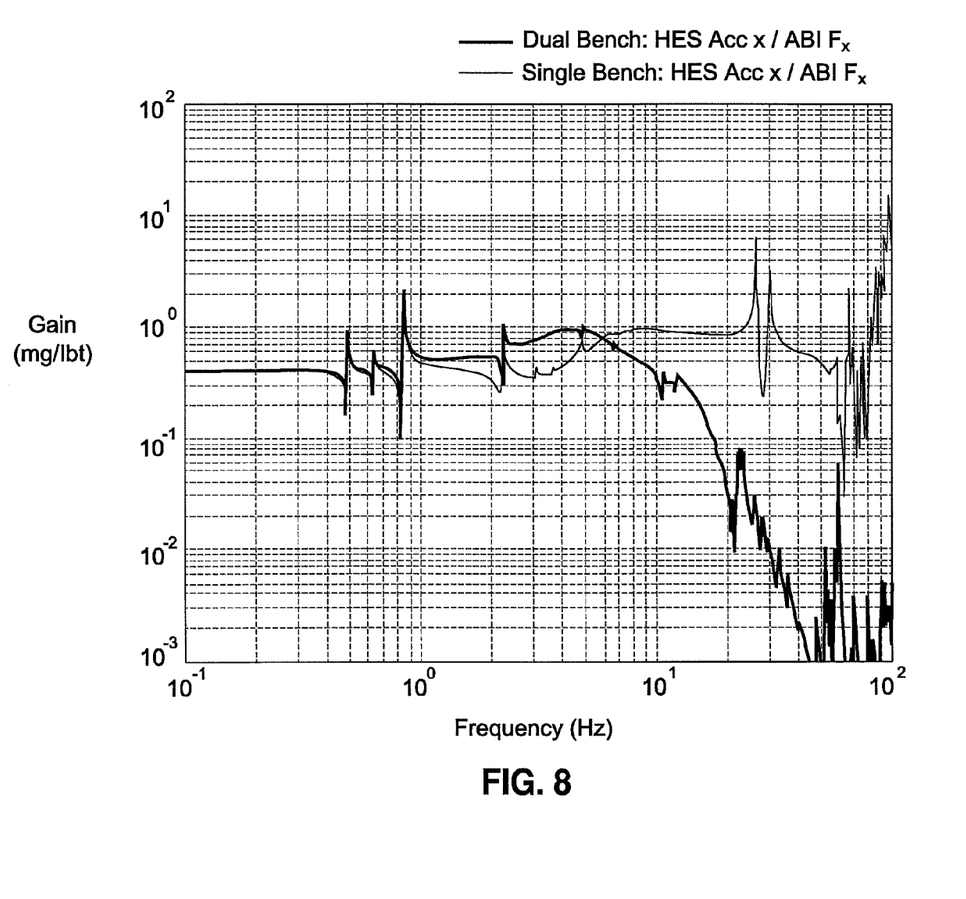
FIG. 8 is a graph illustrating an exemplary FRF from ABI X-axis force to HES X-axis linear acceleration.

The performance of the split deck isolation system (e.g., the multi-platform arrangement depicted in FIGS. 1, 4A and 4B) was compared with that of a single instrument platform system with six isolator struts (e.g., FIG. 6). In this regard, FIGS. 7 and 8 illustrate the instrument-to-instrument benefit of a split-deck (e.g., multi-platform) arrangement. The blue curves show the frequency response functions (FRFs) for a split-deck system according to a split deck isolation system, and the red curves shows the FRFs for a single instrument platform system. FIG. 7 shows the frequency response function (FRF) from ABI X-axis disturbance torque to HES X-axis angular acceleration, and FIG. 8 shows the FRF from ABI X-axis force to HES X-axis linear acceleration.

As can be seen from FIG. 7, at higher frequencies (roughly 10 Hz and above) the use of a split deck isolation system, as compared with a single instrument platform system, provides improved isolation between the ABI and HES. For example, the peak rotational FRF for the single instrument platform system within the frequency band 20 to 100 Hz, where the primary cryo-cooler disturbances are present, is 200 micro-rad/in-lbf-sec$^2$. In contrast, the maximum FRF for the system according to the split deck isolation system is 0.2, which represents an isolation improvement of a factor of 1000. Similar results are shown in FIG. 8, where the peak translational FRF for the single instrument platform system within the 20 to 100 Hz band is 14 milli-g/lbf, and the maximum FRF for the split deck isolation system is 0.08. The isolation improvement in this case is a factor of 175. Similar results may be obtained for other degrees of freedom, and for ABI isolation from HES disturbance.

Accordingly, the use of multiple separate vibration isolated instrument platforms on the spacecraft nadir facing deck is seen to significantly reduce the potential for instrument mechanical interaction. With this arrangement, vibration isolation is provided between each instrument and the spacecraft, and between each of the primary instruments. As such, instruments may be developed independently, without regard to their potential interactions. In addition, cost and risk may be reduced, resulting in simpler, smaller, and lighter instruments.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A system for isolating vibration among a plurality of instruments on a spacecraft, comprising:
    at least two separate platforms, each of which is coupled to and configured to isolate vibration for a respective set of the plurality of instruments on the spacecraft,
    wherein the at least two separate platforms mounted to a nadir facing deck of the spacecraft,
    wherein each of the at least two separate platforms comprises a mounting interface configured to mount a corresponding one of the at least two separate platforms to the spacecraft, and
    wherein each mounting interface comprises a plurality of struts and a strut geometry configured to provide damped isolation modes within a predefined frequency band.

2. The system of claim 1, wherein the number of the at least two separate platforms equals the number of the plurality of instruments, so that each of the plurality of instruments corresponds with a respective platform.

3. The system of claim 1, wherein the plurality of instruments comprise an imager and a sounder.

4. The system of claim 1, wherein each of the at least two separate platforms is configured to perform attitude sensing.

5. The system of claim 4, wherein each of the at least two separate platforms comprises at least one of a star tracker and an inertial measurement unit (IMU), configured to perform the attitude sensing.

6. The system of claim 1, wherein each mounting interface comprises six struts.

7. The system of claim 1, wherein each of the at least two separate platforms comprises an instrument-coupling side and a spacecraft-mounting side opposite the instrument-coupling side.

8. The system of claim 7, wherein the at least two separate platforms are configured such that when the at least two separate platforms are mounted to the same side of the spacecraft as one another, the instrument-coupling side of each of the at least two separate platforms faces the same direction as one another.

9. Th system of claim 1, wherein the at least two separate platforms are coplanar with one another.

10. A spacecraft having a plurality of instruments thereon, the spacecraft comprising:
    a system for isolating vibration among the plurality of instruments,
    wherein the system comprises at least two separate platforms, each of which is coupled to and configured to isolate vibration for a respective set of the at least one of a plurality of instruments on the spacecraft,
    wherein the at least two separate platforms are mounted to a nadir facing deck of the spacecraft,
    wherein each of the at least two separate platforms comprises a mounting interface configured to mount a corresponding one of the at least two separate platforms to the spacecraft, and
    wherein each mounting interface comprises a plurality of struts and a strut geometry configured to provide damped isolation modes within a predefined frequency band.

11. The system of claim 10, wherein the number of the at least two separate platforms equals the number of the plurality of instruments, so that each of the plurality of instruments corresponds with a respective platform.

12. The system of claim 10, wherein the plurality of instruments comprise an imager and a sounder.

13. The system of claim 10, wherein each of the at least two separate platforms is configured to perform attitude sensing.

14. The system of claim 13, wherein each of the at least two separate platforms comprises at least one of a star tracker and an inertial measurement unit (IMU), configured to perform the attitude sensing.

15. The system of claim 10, wherein each mounting interface comprises six struts.

16. The system of claim 10, wherein each of the at least two separate platforms comprises an instrument-coupling side and a spacecraft-mounting side opposite the instrument-coupling side.

17. The system of claim 16, wherein the at least two separate platforms are configured such that when the at least two separate platforms are mounted to the same side of the spacecraft as one another, the instrument-coupling side of each of the at least two separate platforms faces the same direction as one another.

18. The system of claim 10, wherein the at least two separate platforms are coplanar with one another.

* * * * *